(12) United States Patent
Clarke et al.

(10) Patent No.: US 9,672,953 B2
(45) Date of Patent: Jun. 6, 2017

(54) DEVICES AND METHODS FOR ADVANCED PHASE-LOCKED MATERIALS

(71) Applicant: EboNEXT Technologies (BVI), Oakland, CA (US)

(72) Inventors: Stephen R. Clarke, Orinda, CA (US); Robert Clarke, Orinda, CA (US)

(*) Notice: Subject to any disclaimer, the term of this patent is extended or adjusted under 35 U.S.C. 154(b) by 160 days.

(21) Appl. No.: 14/671,784

(22) Filed: Mar. 27, 2015

(65) Prior Publication Data

US 2016/0217881 A1    Jul. 28, 2016

Related U.S. Application Data

(60) Provisional application No. 61/971,461, filed on Mar. 27, 2014.

(51) Int. Cl.
*H01B 1/14*    (2006.01)
*H01B 1/20*    (2006.01)

(52) U.S. Cl.
CPC ............... *H01B 1/14* (2013.01); *H01B 1/20* (2013.01)

(58) Field of Classification Search
CPC ..................................... H01B 1/14; H01B 1/20
See application file for complete search history.

(56) References Cited

U.S. PATENT DOCUMENTS

| | | | | |
|---|---|---|---|---|
| 4,931,213 A | * | 6/1990 | Cass | C04B 35/46 252/502 |
| 5,173,215 A | * | 12/1992 | Clarke | C04B 35/46 423/608 |
| 6,524,750 B1 | * | 2/2003 | Mansuetto | C01G 23/043 429/206 |
| 2004/0136898 A1 | * | 7/2004 | Berger | C23C 4/11 423/598 |
| 2007/0163612 A1 | * | 7/2007 | Miser | A24B 15/18 131/364 |
| 2010/0040533 A1 | | 2/2010 | Simpson et al. | |
| 2014/0128252 A1 | * | 5/2014 | Hosono | C01G 23/003 502/350 |
| 2014/0175604 A1 | * | 6/2014 | Barabash | H01L 28/40 257/532 |

OTHER PUBLICATIONS

Chen, Guoyoing, et al., "Development of Supported Bifunctional Electrocatalysts for Unitized Regenerative Fuel Cells", Journal of the Electrochemical Society, 149 (8) A1092-A1099 (2002).

* cited by examiner

*Primary Examiner* — Mark Kopec
*Assistant Examiner* — Jaison Thomas
(74) *Attorney, Agent, or Firm* — Fish & Tsang, LLP

(57) ABSTRACT

Compositions, devices, and methods of stabilizing Magneli phase materials are presented where the modified materials have a host phase and a locking phase in which locking compounds prevent rearrangement of a Magneli shear plane to a rutile structure and so prevent or reduce the oxidation of the Magneli phase material.

20 Claims, 1 Drawing Sheet

DEVICES AND METHODS FOR ADVANCED PHASE-LOCKED MATERIALS

This application claims the benefit of priority to U.S. provisional application 61/971,461 filed on 27 Mar. 2014. This and all other publications herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

FIELD OF THE INVENTION

The field of the invention is corrosion resistant conductive materials, and especially as it relates to corrosion resistant Magneli phase materials.

BACKGROUND OF THE INVENTION

The background description includes information that may be useful in understanding the present invention. It is not an admission that any of the information provided herein is prior art or relevant to the presently claimed invention, or that any publication specifically or implicitly referenced is prior art.

Lithium-Ion Batteries have become the battery of choice for electric vehicles and high performance hybrid electric vehicles. However, despite the many advantages provided by such batteries, various cost, safety, and performance issues remain. For example, as most lithium ion batteries use graphite in the anode as intercalation host, several problems arise: The low storage voltage of $Li/Li^+$ for graphite tends to result in lithium plating on the graphite surface, especially during poorly managed charging cycles, leading to cell shorting and in some cases fire. Further, the low storage voltage in graphite also causes electrolyte decomposition and the formation of a passivating solid electrolyte interphase on the graphite surface, which consumes significant quantities of lithium and as such substantially reduces energy density. Moreover, the slow $Li^{3+}$ ion transfer in the interface between the solid electrolyte interphase and the graphite often further exacerbates the risk of lithium plating and fires. Finally, and in addition to graphite being an excellent fuel for battery fires, graphite will not adhere directly to metal foil current collectors and must therefore be bound to the surface of the collectors with polymers. The thusly formed polymer matrices have several intrinsic limitations, including resistivity, relatively poor current distribution, and distortion/cracking under cycling.

Inexpensive, abundant, noncombustible, and non-toxic titanium dioxide ($TiO_2$) has been considered by many as an attractive candidate as an intercalation host for Li ions in lithium ion batteries. Advances in the understanding of the mechanism by which $Li^+$ intercalates and/or attaches to the surface of $TiO_2$ nanoparticles have been made in a number of applications outside of batteries. For example, dye sensitized solar cells with $TiO_2$ nanostructures have been reported and it has been reported that nanostructures of $TiO_2$ can be optimized for $Li^+$ intercalation by intercalation within the crystalline structure and/or surface attachment (see e.g., Hairima Y, et al. Improvement of photovoltages in organic dye-sensitized solar cells by Li intercalation in particulate $TiO_2$ electrodes. Appl. Phys. Lett. 2007; 90:103517-103519).

$TiO_2$ can advantageously be sintered directly to the surface of a range of metal foils without a polymer binder, and such coatings tend to have an improved resistance to abrasion, cracking, and separation. Alternatively, EU 1244168 describes methods for attaching films of mesoporous $TiO_2$ and other metal oxides to the surface of metal foils by means of a polymer network that passes through the mesoporous structures rather than adhering to their surface (and thus inhibiting conductivity). As a result, high throughput "roll to roll" coating of mesoporous $TiO_2$ is now possible and relatively inexpensive. Unfortunately for all mesoporous forms of $TiO_2$ (anatase, rutile, and more recently $TiO_2(B)$), the usefulness of $TiO_2$ coated foils is rather limited due to the insulating properties of $TiO_2$'s crystalline structure, allowing only for very modest power densities, typically not exceeding a few $mW/cm^2$. While such power densities are often adequate for dye-sensitized solar cells applications, they are not sufficient to warrant interest in high power and/or high current density applications.

Magneli phase sub-oxides of titanium (MPST) are similar to $TiO_2$, but are electrically conductive, chemically inert, cannot burn, and will not participate in thermal runaway reactions. MPSTs are of the formula $Ti_nO_{(2n-1)}$ where n is between 3 and 10. Unfortunately, $Ti_3O_5$ has been found to be unstable in oxidizing conditions. Consequently, Magneli phases of titanium oxide that are commercially useful, are the phases where n lies in the range of 4 to 10, inclusive. It is generally believed that MPSTs derive their properties from a structure in which layers of two dimensional chains of octahedral $TiO_2$ are separated by layers in which oxygen atoms are missing. These oxygen deficient layers are known as Magneli shear planes (MSP). The combination of electrical conductivity and similarity to $TiO_2$, have made MPSTs attractive for high performance electrodes in a number of advanced energy devices, including ozone generation, electrochemical reduction/oxidation reactions, air electrodes for metal air batteries, and highly stable catalyst supports for PEM fuel cells. The stability and performance advantages of monolithic MPSTs are well documented in these applications.

The most conducting MPST is $Ti_3O_5$, which has an MSP, at every 3rd layer. The most researched MPST is $Ti_4O_7$ which is stable in oxidizing conditions has an MSP, at every 4th layer and is approximately 2.7 times more conductive than graphite. The last useful and least electrically conductive phase is $Ti_{10}O_{19}$ which has a MSP every 10th layer and an electrical conductivity approaching that of $TiO_2$. Importantly, the surface structure of MPSTs are predominantly that of blocks octahedral $TiO_2$, separated by the edges of the MSPs. Consequently, $Ti_3O_5$ has the lowest ratio of octahedral $TiO_2$ to MSP and $Ti_{10}O_{19}$ has the highest.

Notably, one important limitation of MPSTs is that, at the nanoscale, the surface layers are susceptible to oxidation and will revert back to the electrically insulating $TiO_2$. Although research into this phenomenon is incomplete, instability appears to be greatest in $Ti_3O_5$ and $Ti_4O_7$, and least in $Ti_{10}O_{19}$. At the micron scale, this limitation is insignificant and monolithic MPSTs are attractive and proven in many applications. However, from a practical perspective, conventional MPSTs are unstable as nanostructures and as nanoscale surface features (such as the mesoporous structures desired for use as high surface area electrodes and catalyst supports). Research into conventional MPSTs as an alternative to graphite in lithium ion batteries has so far been limited to the poorly conductive MPSTs $Ti_9O_{17}$ and $Ti_{10}O_{19}$, coated with a protective layer of carbon to protect the MPST from oxidation. The results of such attempts were predictably mixed, reflecting the compromises inherent in the material.

In another approach (*J. Electrochem. Soc.* 2002, Volume 149, Issue 8, A1092-A1099), a fully oxidized Magneli Phase material was created that included an element of dissimilar size to Ti to thereby distort the crystal lattice into a structure in which crystallographic shear planes were present. While niobium and tantalum were shown to increase oxidation resistance, their expense and scarcity presents a significant limitation to this approach. Likewise, other suitable dissimilar elements for such use were high cost rare earth metals.

Thus, even though numerous materials are known to produce electrode materials with desirable properties, all or almost all of them suffer from one or more disadvantages. Therefore, there is still a need for improved systems, compositions, and methods to produce a highly stable and corrosion resistant electrode material.

SUMMARY OF THE INVENTION

The inventors have now discovered a novel method of stabilizing a number of Magneli phase materials, and especially nanostructured materials such that they resist oxidation to a non-conducting form, even when exposed to oxidizing conditions. In particularly preferred aspects, stabilization of the improved material is achieved by sterically locking the Magneli phase such that transition to the rutile phase is inhibited.

In one aspect of the inventive subject matter, phase locked material that comprises a host phase comprising a Magneli phase crystalline structure and that further comprises a locking phase coupled to or formed in the host phase, wherein the locking phase includes a Magneli phase shear plane, and wherein the locking phase will comprise a locking compound within or adjacent to the Magneli phase shear plane in an amount sufficient to inhibit rearrangement of the Magneli phase shear plane to a rutile phase.

In further contemplated aspects, the host phase comprises a titanium oxide (e.g., $Ti_4O_7$), a tungsten oxide, or a vanadium oxide, and the locking compound is a metal ion or a metal oxide. Preferably, but not necessarily, the locking compound is a metal ion or a metal oxide that is formed from one or more of Li, Na, K, Rb, Cs, Be, Mg, Ca, Sr, Ba, Al, and Zn. Where desired, the phase locked material is a mesoporous material and/or has a nanoparticulate structure. Moreover, a conductive carrier may be coupled to the phase locked material. For example, suitable conductive carriers may be configured as an electrode (e.g., for a metal/air battery).

Consequently, the inventors also contemplate a method of manufacturing a phase locked material. Such methods will generally comprise a step of providing a material that has a host phase, wherein the host phase comprises a Magneli phase crystalline structure. In another step, the host phase is reacted with a metal hydride at a temperature sufficient to generate a locking phase, wherein the locking phase includes a metal ion or metal oxide within or adjacent to a Magneli phase shear plane. Most typically, the metal ion or metal oxide is formed from the metal hydride and is present in the locking phase in an amount sufficient to inhibit rearrangement of the Magneli phase shear plane to a rutile phase.

As noted before, it is contemplated that the host phase comprises a titanium oxide, a tungsten oxide, or a vanadium oxide, and/or that the metal hydride comprises at least one of Li, Na, K, Rb, Cs, Be, Mg, Ca, Sr, Ba, Al, and Zn. Among other temperatures, contemplated reaction temperatures will typically be at least 200° C., and incubation will be performed under controlled atmosphere or vacuum to control/preclude oxygen. Suitable host phase materials may be mesoporous materials or have a nanoparticulate structure. In further aspects, contemplated methods include a step of coupling the phase locked material to a conductive carrier or incorporating the phase locked material into a polymer of a conductive material. Preferably, the conductive carrier may be configured as an electrode.

Various objects, features, aspects and advantages of the inventive subject matter will become more apparent from the following detailed description of preferred embodiments, along with the accompanying drawing figures in which like numerals represent like components.

DETAILED DESCRIPTION

Figure 1:
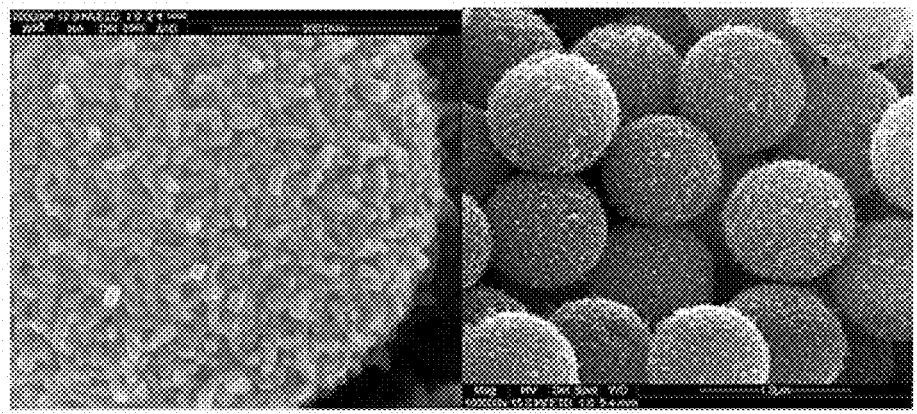
FIG. 1 is an exemplary SEM picture of suitable mesoporous TiO2 structures suitable for conversion into the phase locked materials according to the inventive subject matter.

The inventive subject matter is drawn to various compositions, devices, and methods of producing phase locked materials in which the material comprises a host phase and a locking phase, most typically adjacent to each other. The term "host phase" as used herein refers to a material phase that has a Magneli phase crystalline structure characterized by the presence of a Magneli phase shear plane (which is readily identifiable through established crystallographic imaging). The term "locking phase" as used herein refers to a material having a Magneli phase shear plane that is limited in its ability to shear or re-align and is characterized by the inclusion of a locking structure that includes a metal atom, ion, oxide or compound, which is distributed within and immediately adjacent to the Magneli Shear Plane.

It should be recognized that the mechanism through which non-conductive metal oxides are converted into electrically conducting Magneli phase sub-oxides requires a rearrangement of the material's crystal structure involving the creation of Magneli shear planes. Conversely, any mechanism of oxidization of a Magneli phase material back to a fully oxidized state (e.g. the oxidation of $Ti_4O_7$ into $TiO_2$) requires a reversal of the physical arrangement of the material's crystal structure. This requires the partial or complete elimination of the Magneli shear planes. In the case of the Magneli phase titanium oxide $Ti_4O_7$, it will require some or all of the Magneli phase crystalline structure to convert into the rutile crystalline structure of $TiO_2$. Consequently, it should be appreciated that the effect of a combined crystalline structure having a host phase and a locking phase is that the mechanism by which oxidation occurs is inhibited by the immobility of the MSPs induced by the Locking Phase. Viewed from a different perspective, the inability of the MSPs to realign effectively inhibits oxidation of the Magneli phase materials and so provides unique stability towards oxidation at the nanoscale.

In one aspect of the inventive subject matter, materials are contemplated that comprise a sterically locked crystalline structure in which a metal atom or metal ion is included in a Magneli phase material such that the metal atom or ion inhibits realignment of the MSPs in the Magneli phase material to rutile arrangement in oxidized form. Therefore, thusly modified Magneli phase material will resist surface oxidation and is uniquely stable at the nanoscale. Accordingly, the so modified material can advantageously be employed in devices, systems, and methods where high surface area electrodes, thermodynamically stable, non-combustible, and/or chemically inert materials are required. Among other suitable devices, especially contemplated devices include $Li^+$ hosts in a lithium-ion battery, gas diffusion or air electrodes in fuel cells or batteries (e.g., in a metal-air battery such as zinc-air, lithium-air, magnesium-air, aluminum-air, etc.), anodes in redox flow batteries, bipole electrodes in batteries, fuel cells, or other electrochemical devices, catalyst supports, and/or corrosion resistant current collector and/or electrical connectors.

For example, contemplated phase locked materials especially include those with a host phase comprising a $Ti_4O_7$ Magneli phase and a locking phase comprising potassium atoms or ions. Additional and/or alternative Magneli phases of titanium oxide are also deemed suitable and include $Ti_3O_5$, $Ti_5O_9$, $Ti_6O_{11}$, $Ti_7O_{13}$, $Ti_8O_{15}$, $Ti_9O_{17}$, and/or $Ti_{10}O_{19}$. Similarly, other metals that form Magneli phases also expressly contemplated and especially include vanadium oxides and tungsten oxides. For example, vanadium oxides will include $V_2O_3$ and $V_3O_5$, while tungsten oxides will include $W_{32}O_{84}$, $W_3O_8$, $W_{18}O_{49}$, and $W_{17}O_{47}$. Of course, it should also be noted that all reasonable combinations of Magneli phase materials are deemed suitable for use herein. Still further, it is contemplated that Magneli phase materials are not necessarily limited to metal oxides, but may also include metal chalcogens (sulfur, selenium, tellurium, polonium).

With respect to locking phases it is contemplated that all compounds and compositions are suitable provided the locking phase includes at least one Magneli phase shear plane. Thus, and most typically, the locking phase will include a Magneli phase material as discussed for the host phase above, and all considerations as noted above therefore also apply for the locking phase. In addition, however, the locking phase will also include one or more locking compounds, and most preferably a metal or metal ion as a locking compound. Among other suitable locking compounds, especially contemplated locking compounds include Li, Na, K, Rb, Cs, Be, Mg, Ca, Sr, Ba, Al, and/or Zn, and the corresponding cations or oxides formed therefrom. The additional locking compound is typically located within or adjacent (e.g., within less than 100 nm, or less than 50 nm, less than 10 nm, etc.) to the Magneli phase shear plane.

The locking compound is preferably present in the locking phase in an amount sufficient to inhibit rearrangement of the Magneli phase shear plane to a rutile phase. For example, and relative to the locking phase, the locking compound is present between 0.001 wt % and 0.01 wt %, or between 0.01 wt % and 0.1 wt %, or between 0.1 wt. % and 1 wt %, or between 1 wt % and 10 wt %, or even more. Unless the context dictates the contrary, all ranges set forth herein should be interpreted as being inclusive of their endpoints, and open-ended ranges should be interpreted to include commercially practical values. Similarly, all lists of values should be considered as inclusive of intermediate values unless the context indicates the contrary. Proper quantities of the locking compound in the locking phase to produce oxidation resistant materials will depend at least in part on the type of host phase material and ratio of Magneli shear planes to rutile phase, and the person of ordinary skill in the art will be readily appraised of the proper quantities based on measurement of the corrosion or reduction of corrosion.

Typically, the distribution of the locking compound is homogenous or in gradient fashion in the locking phase (e.g., higher concentration near surface of locking phase and decreasing concentration in direction of the host phase). Depending on the exact distribution of the locking compound, the thickness of the locking phase may therefore vary considerably. For example, the locking phase may have a thickness of between 10 nm and 50 nm, between 50 nm and 100 nm, between 100 nm and 300 nm, between 300 nm and 700 nm, between 700 nm and 1000 nm, between 1 µm and 10 µm, between 10 µm and 20 µm, between 20 µm and 50 µm, and even more. Likewise, the thickness of the host phase may vary as well. Thus, suitable thicknesses of the host phase are typically those of the locking phase, and in some cases even thicker, including thicknesses between 50 µm and 100 µm, between 100 µm and 500 µm, between 500 µm and 1000 µm, and even thicker.

Most typically the host phase and the locking phase are not physically separable phases but will be continuous with respect to the crystalline structure, particularly where the locking phase is formed in a thermal solid state reduction process. Therefore, the two phases may have different thicknesses, with the locking phase being thinner than the host phase. Alternatively, the locking phase may also be a separate material that is coupled to a host phase or other conductive material. Consequently, in some aspects the locking phase and the host phase form a monolithic structure that has no separable layers (host phase vs. locking phase) and the locking phase is formed from a portion of the host phase. In other aspects, separate and individual phases may be coupled together to form a compound structure in which the locking phase typically forms an outer surface of the compound structure. As used herein, and unless the context dictates otherwise, the term "coupled to" is intended to include both direct coupling (in which two elements that are coupled to each other contact each other) and indirect coupling (in which at least one additional element is located between the two elements). Thus, the terms "coupled to" and "coupled with" are used synonymously.

Contemplated phase locked materials comprising the host and locking phases may be configured in numerous manners. However, the phase locked materials of the inventive subject matter are most typically formed as mesoporous structures (i.e., having pores with diameters of between 2 and 50 nm) and/or nanoparticulate structures (i.e., having a largest dimension of between 1 and 100 nm, or between 10 and 500 nm, or between 50 and 300 nm, or between 200 and 700 nm, etc.). Furthermore, where nanoparticulate structures are present, it is contemplated that they may be formed as spheres, fibers, tubes, or combinations thereof, and that they may be aggregated (e.g., physically connected to each other via melting, sintering, binder, etc.), in lose association (e.g., as pressed powder), or even dispersed in a liquid or solid phase. In still other aspects, the nanoparticulate structures may also be formed into or onto larger structures or surfaces, having micron-sized or millimeter-sized dimensions (e.g., films). Similarly, it is noted that contemplated materials may be initially formed as larger macroporous structures (e.g., smallest dimension at least 200 µm, or at least 100 µm, or at least 1 mm, etc.), which are then reduced in size to form mesoscale or nanoscale structures.

Consequently, all materials and shapes are deemed suitable and especially contemplated bulk materials comprising the phase locked materials include sheets, blocks, tubes, rods, foams containing phase locked materials or coated with phase locked materials that may or may not be disposed in a binder or other carrier substance. Therefore, phase locked materials may be added onto or incorporated into various polymer, glass, and/or metal matrices. Likewise, composite materials comprising phase locked materials are also deemed suitable, especially where such composite materials are formulated and/or used as coating materials. For example, mesoporous or nanoparticulate structures may be attached to metal substrates to form conductive and corrosion resistant composite materials, and especially stable corrosion resistant, electronically conductive, high surface area materials that can be used as electrodes, catalyst supports, and/or current collectors in electrochemical processes or environments that are subject to oxidative conditions. However, in further aspects of the inventive subject matter, contemplated phase locked materials may also be coupled to or incorporated into various non-metallic, semi-conducting, or even insulating substrates. Contemplated phase locked materials (with or without carrier material) may be added onto or incorporated into a substrate materials using all known manners, including plasma spraying, slot coating/sintering, coating with polymer binders, kinetic deposition methods such as D-gun spraying, etc.

Consequently, and depending on the particular configuration, it should be appreciated that the phase locked materials may be employed in a variety of uses, and particularly contemplated uses include $Li^+$ intercalation electrodes in electrochemical devices and processes, high surface area, mesoporous intercalation anodes for positively charged ions of alkali metals, including $Li^+$, $Na^+$, $K^+$, high surface area, mesoporous and corrosion resistant, electronically conductive catalyst supports for batteries, fuel cells, water purification, and other electrochemical devices and processes, and corrosion resistant, electronically conductive current collectors and electron transporters for batteries, fuel cells, water purification, and other electrochemical devices and processes.

In another aspect of the inventive subject matter, contemplated phase locked materials can be prepared in a conceptually simple and effective manner. Most typically, synthesis starts with mesoporous or nanostructured $TiO_2$ materials that are then converted into the phase locked material via a solid phase high temperature (e.g., above 200° C.) reduction process using a metal hydride compound (e.g., incubation in the presence of and admixture with metal hydrides of Li, Na, K, Rb, Cs, Be, Mg, Ca, Sr, Ba, Al, or Zn). Most typically, such solid phase high-temperature process will provide sufficient reduction via the hydrogen component of the metal hydride while at the same time providing a metal compound (e.g., metal ion or metal oxide) to so generate the locking phase.

For example, mesoporous $TiO_2$ spheres as exemplarily shown in FIG. 1 and commonly used in dye sensitized solar cells have a diameter of about 5-8 μm and pores with a size of about 5-50 nm. Such material is then subjected to a heating process in the presence of finely milled KH or LiH at a temperature sufficient to generate Magneli phase $Ti_4O_7$ as a host phase into a portion of which K or Li is intercalated in the Magneli shear plane, typically at and near the outer surface of the materials. Thus, locking phase is generated during the same process that also forms the host phase. Depending on the type of metal hydride and starting material (e.g., $TiO_2$, $VO_2$, etc.), the temperature range for the reaction is typically at or above 100° C., at or above 150° C., at or above 200° C., at or above 250° C., at or above 350° C., at or above 500° C. In most cases, it is contemplated that the metal hydride and the metal oxide staring material will be present in about same quantities (weight basis), however, alternative weight ratios of metal oxide to metal hydride are also contemplated and include up to 2:1, up to 5:1, up to 10:1, up to 50:1, up to 100:1, and even higher. Likewise, the reaction times will vary considerably and will typically depend on the reaction temperature, surface structure of the reagents, and particular materials. However, typical reaction times will be between 15 min and 60 min, between 60 min and 180 min, or between 180 min and 6 hrs, or between 6-12 hrs, or even longer. In further contemplated aspects, it is noted that instead of generating the Magneli host phase at the same time with the locking phase, a process may also be employed with Magneli phase materials already formed where the reaction with the metal hydride will provide the metal ion for the locking phase. Most typically, the reaction conditions and reaction parameters will be substantially as described above. Of course, it should be appreciated that the generation of the host and locking phases may also be supplemented by a reaction with molecular hydrogen, mixtures of hydrogen and argon, and other inert gases with or without carbon monoxide at elevated temperatures substantially as described above.

Figure 2:
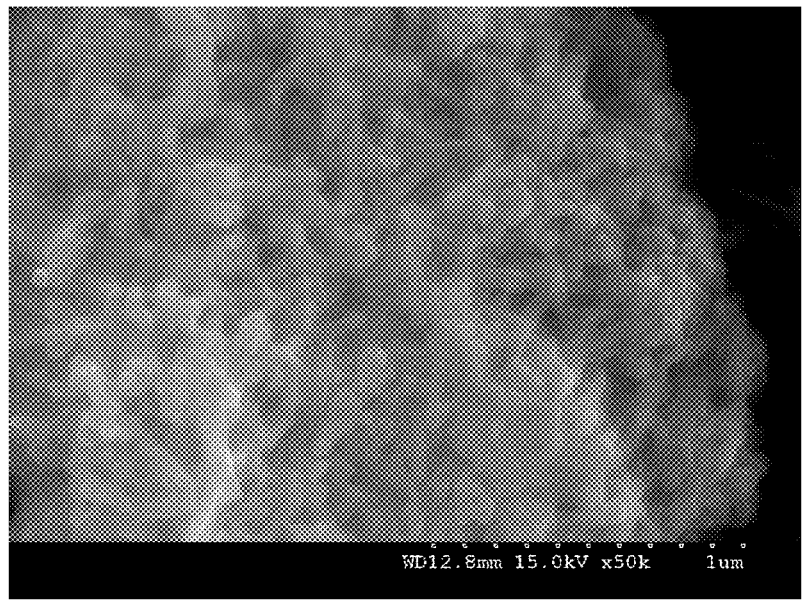
FIG. 2 is an exemplary SEM picture of a phase locked material formed form the TiO2 structures of FIG. 1.

Formation of the locking phase may be confirmed using numerous manners well known in the art and include crystallographic methods as well as methods that characterize corrosion resistance by conductivity analysis of the phase locked materials under oxidizing conditions (e.g., in comparison with untreated Magneli phase materials such as $Ti_4O_7$). Likewise, corrosion resistance can be ascertained by visual macroscopic comparison with untreated Magneli phase materials. A typical example, of locked phase material is shown in the SEM picture of FIG. 2 where the material comprises a $Ti_4O_7$ host phase and a locking phase in which K is intercalated into/near the Magneli shear planes of the locking phase.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques.

It should be apparent to those skilled in the art that many more modifications besides those already described are possible without departing from the inventive concepts herein. The inventive subject matter, therefore, is not to be restricted except in the scope of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A phase locked material, comprising:
   a host phase comprising a Magneli phase crystalline structure; and a locking phase coupled to or formed in the host phase and comprising a Magneli phase shear plane;

wherein the locking phase further comprises a locking compound within or adjacent to the Magneli phase shear plane in an amount sufficient to inhibit rearrangement of the Magneli phase shear plane to a rutile phase.

2. The phase locked material of claim 1 wherein the host phase comprises a titanium oxide, a tungsten oxide, or a vanadium oxide.

3. The phase locked material of claim 1 wherein titanium oxide comprises $Ti_4O_7$.

4. The phase locked material of claim 1 wherein the locking compound is a metal ion or a metal oxide.

5. The phase locked material of claim 1 wherein the locking compound is a metal ion or a metal oxide selected from the group consisting of Li, Na, K, Rb, Cs, Be, Mg, Ca, Sr, Ba, Al, and Zn.

6. The phase locked material of claim 1 wherein the metal ion or a metal oxide is a metal ion or a metal oxide selected from the group consisting of Li, Na, and K.

7. The phase locked material of claim 1 wherein the material is a mesoporous material.

8. The phase locked material of claim 1 wherein the material has a nanoparticulate structure.

9. The phase locked material of claim 1 further comprising a conductive carrier coupled to the phase locked material.

10. The phase locked material of claim 9 wherein the conductive carrier is configured as an electrode.

11. A method of manufacturing a phase locked material, comprising:

providing a material that comprises a host phase, wherein the host phase comprises a Magneli phase crystalline structure;

reacting the host phase with a metal hydride at a temperature sufficient to generate a locking phase;

wherein the locking phase includes a metal ion or metal oxide within or adjacent to a Magneli phase shear plane; and wherein the metal ion or metal oxide is formed from the metal hydride and is present in the locking phase in an amount sufficient to inhibit rearrangement of the Magneli phase shear plane to a rutile phase.

12. The method of claim 11 wherein the host phase comprises a titanium oxide, a tungsten oxide, or a vanadium oxide.

13. The method of claim 12 wherein titanium oxide comprises $Ti_4O_7$.

14. The method of claim 11 wherein the metal hydride is a hydride of a metal selected from the group consisting of Li, Na, K, Rb, Cs, Be, Mg, Ca, Sr, Ba, Al, and Zn.

15. The method of claim 11 wherein the metal hydride is a hydride of a metal selected from the group consisting of Li, Na, and K.

16. The method of claim 11 wherein the temperature is at least 200° C.

17. The method of claim 11 wherein the phase locked material is a mesoporous material.

18. The method of claim 11 wherein the phase locked material has a nanoparticulate structure.

19. The method of claim 11 further comprising a step of coupling the phase locked material to a conductive carrier or incorporating the phase locked material into a polymer of a conductive material.

20. The method of claim 19 wherein the conductive carrier is configured as an electrode.

\* \* \* \* \*